A. FREDERIKSEN.
THREE-PRONGED SAFETY PIN.
APPLICATION FILED MAR. 11, 1909.
959,499.
Patented May 31, 1910.
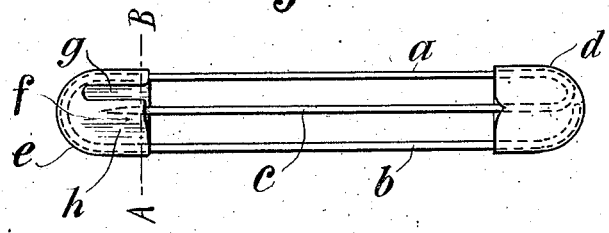
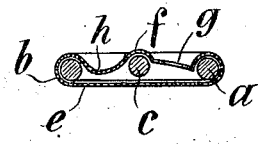
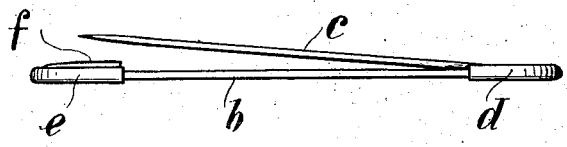
Witnesses:
H C Hunsberger
L. Lang
Inventor:
Anton Frederiksen
by B. Singer
Attorney

UNITED STATES PATENT OFFICE.

ANTON FREDERIKSEN, OF COPENHAGEN, DENMARK.

THREE-PRONGED SAFETY-PIN.

959,499.

Specification of Letters Patent. Patented May 31, 1910.

Application filed March 11, 1909. Serial No. 482,840.

*To all whom it may concern:*

Be it known that I, ANTON FREDERIKSEN, merchant, a subject of the King of Denmark, residing in the city of Copenhagen, Denmark, have invented a new and useful Improvement in Three-Pronged Safety-Pins, which improvement is fully set forth in the following specification and accompanying drawings.

This invention relates to improvements in safety pins and is particularly designed for that class of pins wherein the pin shank is disposed between two members constituting a frame and wherein the ends of the frame members are provided with a suitable form of shield or guard which also acts to control the pin point of the shank.

One of the objects of my invention is to provide a shield having a slit or opening for receiving the point of the pin shank and for holding the pin shank in a suitable normal position when disposed within the shield.

A further object is to provide such a shield with means for limiting movement of the hinge shank beyond a normal position so as to indicate to the user that pressure on the pin shank in such a direction is opposite to the direction of movement which should be applied to the pin shank to release the same from the shield or guard through the slit therein.

The invention will be more fully described in connection with the accompanying drawing and will be more particularly pointed out in and by the appended claim.

In the drawing:—Figure 1 is a plan view of a safety pin embodying one form of my invention. Fig. 2 is a sectional view on line A—B of Fig. 1. Fig. 3 is an end view showing the pin shank released.

Like characters of reference designate similar parts throughout the different figures of the drawing.

As shown the frame members and the pin shank are formed of a single length of material or wire and a shield or guard is provided at each end of the safety pin, although it will be understood that I do not wish to be limited to this specific construction except for such limitations as the claim imports.

In the form shown the pin shank is designated at $c$ and is disposed between two parallel members $a$ and $b$ constituting the frame. A guard or shield $e$ is provided at one end of the pin to inclose and rigidly hold the members $a$, $b$ and permit relative lateral shifting movement of the pin shank $c$ with respect to the members $a$ and $b$. At the opposite end of the safety pin a guard or shield $d$ is provided which preferably incloses one end portion of the shank $c$ and also the ends of the frame members $a$ and $b$. The guard $e$ is provided with an opening or slit $g$ to permit of removing and inserting the pin point of the shank $c$ therein. The opening or slit $g$ is preferably disposed laterally of the center of the guard $e$ as shown. Centrally of the guard $e$ a raised portion $f$ is provided to receive the pin point of the shank $c$ and the resiliency of the wire of which the shank $c$ is composed is arranged to normally cause the pin point of the shank to enter and engage the raised portion $f$ and seat therein. On that side of the center of the shield, opposite to the slit $g$ the upper and lower portions of the shield $e$ are brought together, preferably by embedding the upper portions at $h$. The space between the upper and lower portions of the shield $e$ at $h$ is reduced to such an extent that passage of the pin point of the shank $c$ therebetween is rendered impossible so that when the user accidentally shifts the shank $c$ in the wrong direction to release the same from the shield the shifting movement will be resisted and stopped and this will indicate to the user that the shank is being shifted in the wrong direction. The operator will then shift the shank in another direction and the same will be released through the opening $g$.

I claim:—

A safety pin comprising in combination, two parallel members constituting the frame, a pin positioned centrally of said members and provided with a pin point, and a shield provided with upper and lower portions inclosing said members and pin point, one of said portions being recessed to receive the pin point when the same is in a normal or central position and also having a slit located laterally of the normal position of said point, said upper and lower portions being in close relation on that side of said recessed portion opposite said slit to prevent substantial movement of said point in such direction.

In testimony whereof I affix my signature in presence of two witnesses.

ANTON FREDERIKSEN.

Witnesses:
 HANS PEDERSEN,
 CARL KROGLE.